No. 769,717. PATENTED SEPT. 13, 1904.
C. RYAN.
NUT LOCK.
APPLICATION FILED NOV. 20, 1903.
NO MODEL.

Witnesses,
W. H. Palmer
Emily F. Otis

Inventor,
Catharine Ryan.
By Lothrop & Johnson
her Attorneys.

No. 769,717.                                              Patented September 13, 1904.

UNITED STATES PATENT OFFICE.

CATHARINE RYAN, OF ST. PAUL, MINNESOTA.

NUT-LOCK.

SPECIFICATION forming part of Letters Patent No. 769,717, dated September 13, 1904.

Application filed November 20, 1903. Serial No. 181,909. (No model.)

*To all whom it may concern:*

Be it known that I, CATHARINE RYAN, a citizen of the United States, residing at St. Paul, in the county of Ramsey and State of Minnesota, have invented certain new and useful Improvements in Nut-Locks, of which the following is a specification.

My invention relates to improvements in nut-locks, its object being to provide means for preventing the nut from becoming loose from the bolt.

Figure 1:
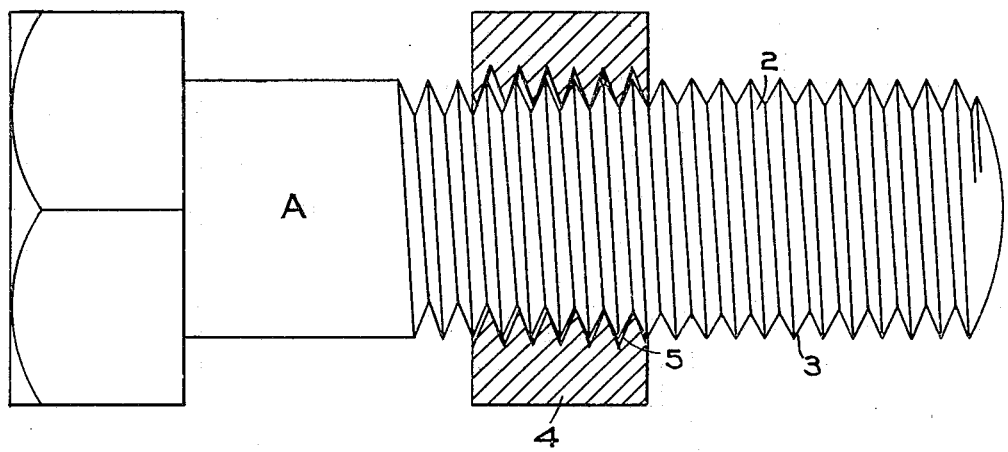
Figure 2:
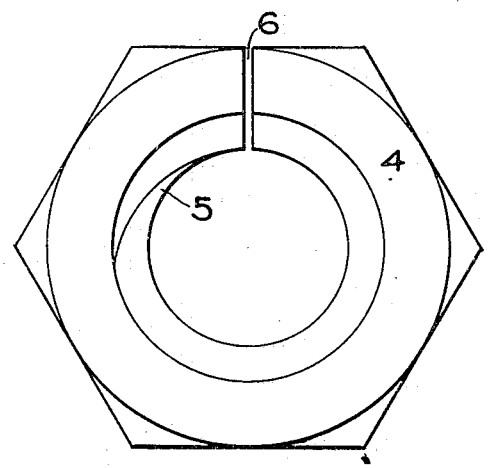

In the accompanying drawings, forming part of this specification, Figure 1 is a view of a bolt and nut embodying my invention, the nut being shown in section; and Fig. 2 is a detail of the nut.

In the drawings, A represents the bolt, having a threaded end 2. The thread 3, as shown, is cut to a greater depth toward the ends of the threaded portion than at the center, the entire outer edge of the thread being equidistant from the center of the bolt. Threaded upon the bolt is a nut 4, having an interior thread 5, intermeshing with the thread of the bolt. The nut is formed upon one side with a split 6. As the nut travels over the center of the threaded portion the nut will be expanded by the shallower part of the thread, and as it is carried to the inner end of the threaded portion the deepening of the thread will allow the nut to contract, this being permitted by the split 6. By having the outer edge of the entire thread equidistant from the center of the bolt looseness of the bolt in any part through which it passes is prevented. If the entire edge of the thread was not equidistant from the center, the opening in a fish-plate or other part through which the bolt might pass would have to be as large as the diameter of the bolt in the center, and consequently much larger than the diameter at the inner end of the threaded portion, causing looseness.

Having now described my invention, what I claim as new, and desire to secure by Letters Patent, is—

1. In combination, a threaded bolt, the thread being cut deepest toward the ends of the threaded portion of the bolt, the entire outer edge of the thread being equidistant from the center of the bolt, and a split nut formed with an inner thread arranged to engage with said bolt-thread, the nut-thread being deeper than the shallowest portion of the bolt-thread.

2. In combination, a threaded bolt and a split nut formed with a thread arranged to engage with said bolt-thread, said bolt-thread being cut shallowest intermediate of its ends, and the thread of said nut being deeper than the shallowest portion of the bolt-thread to cause spreading of said nut.

In testimony whereof I affix my signature in presence of two witnesses.

CATHARINE RYAN.

Witnesses:
H. S. JOHNSON,
EMILY F. OTIS.